A. E. MUELLER.
MOTOR VEHICLE.
APPLICATION FILED JULY 22, 1916.

1,276,250.

Patented Aug. 20, 1918.
6 SHEETS—SHEET 2.

WITNESSES:

INVENTOR.
August E. Mueller
BY
ATTORNEY

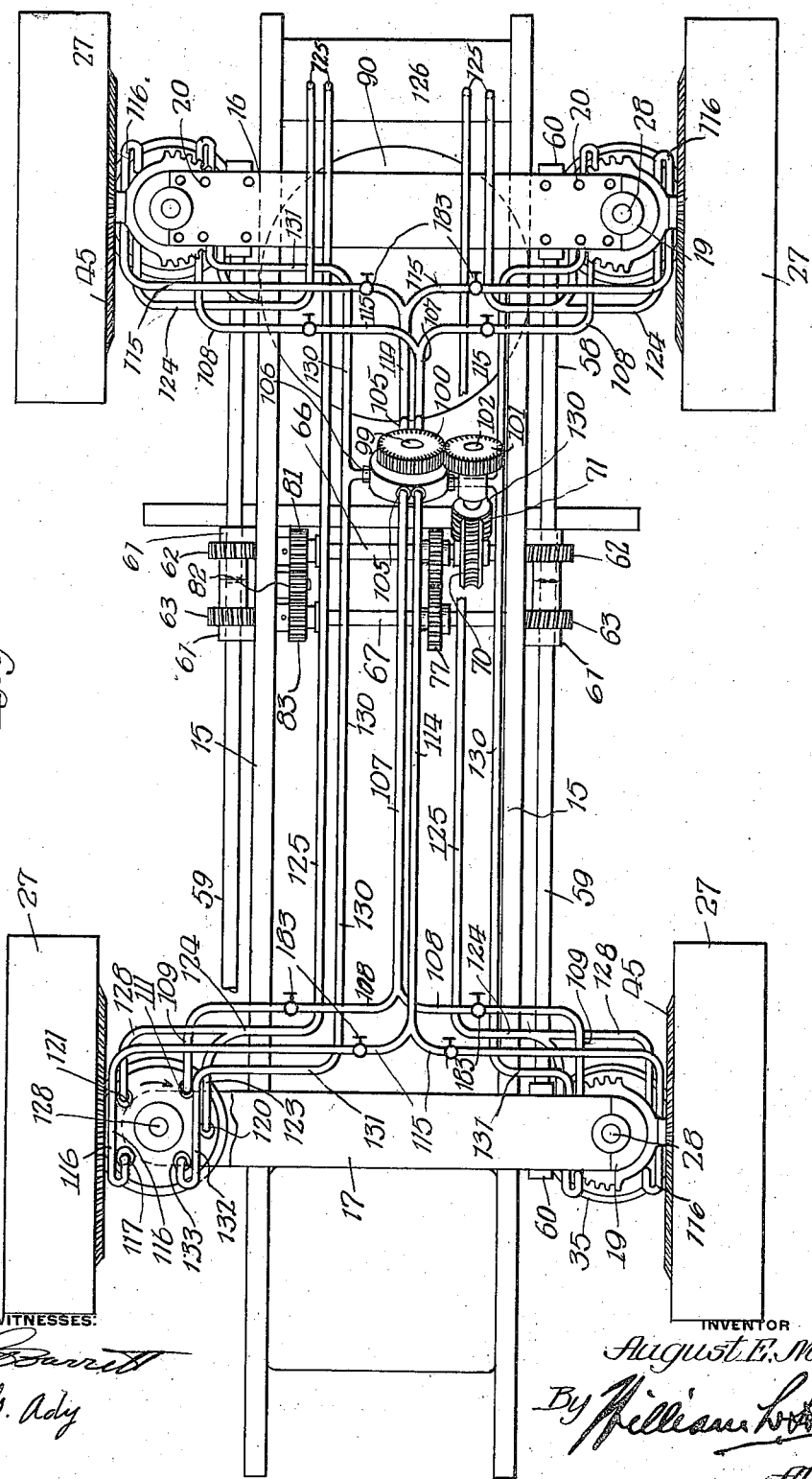

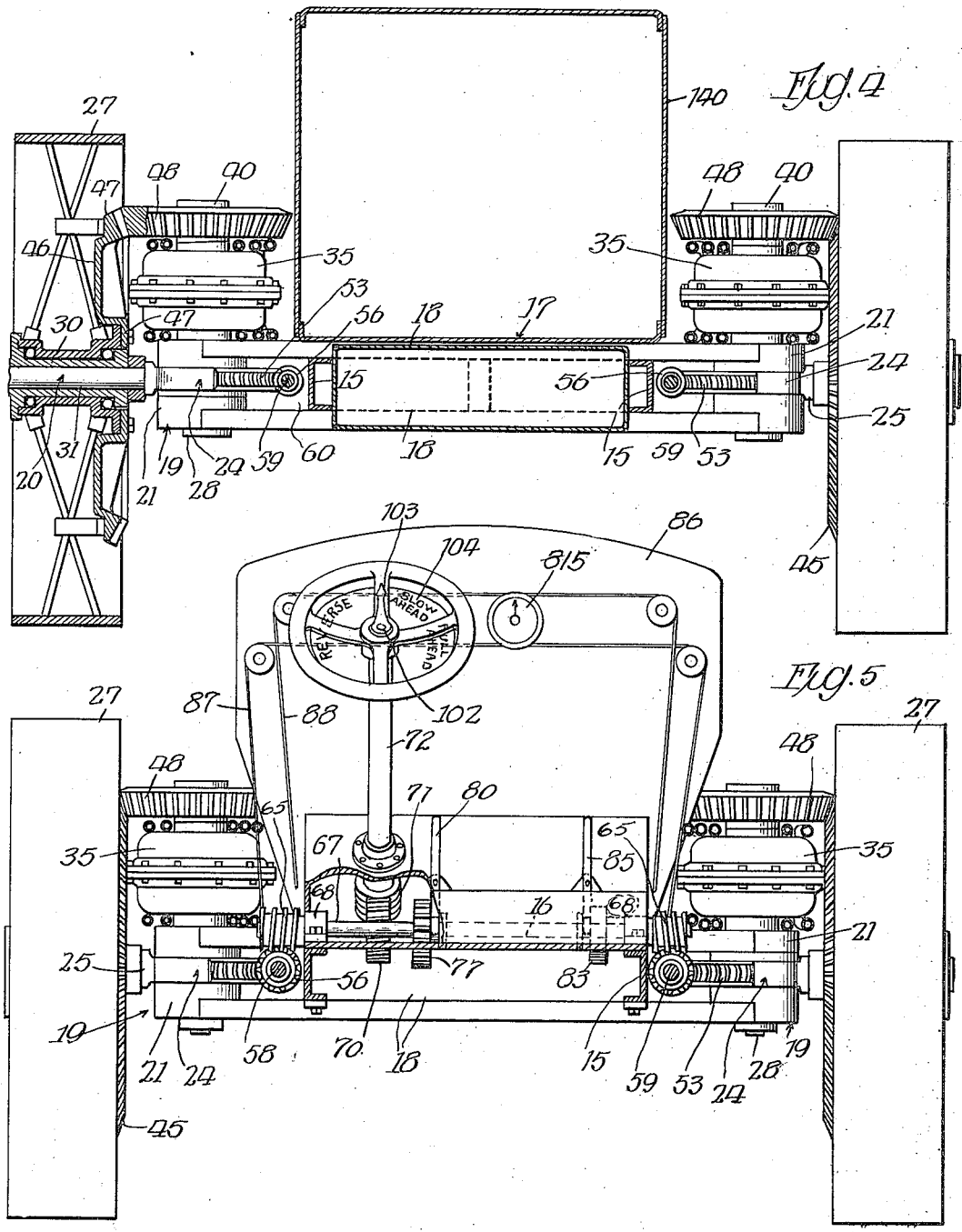

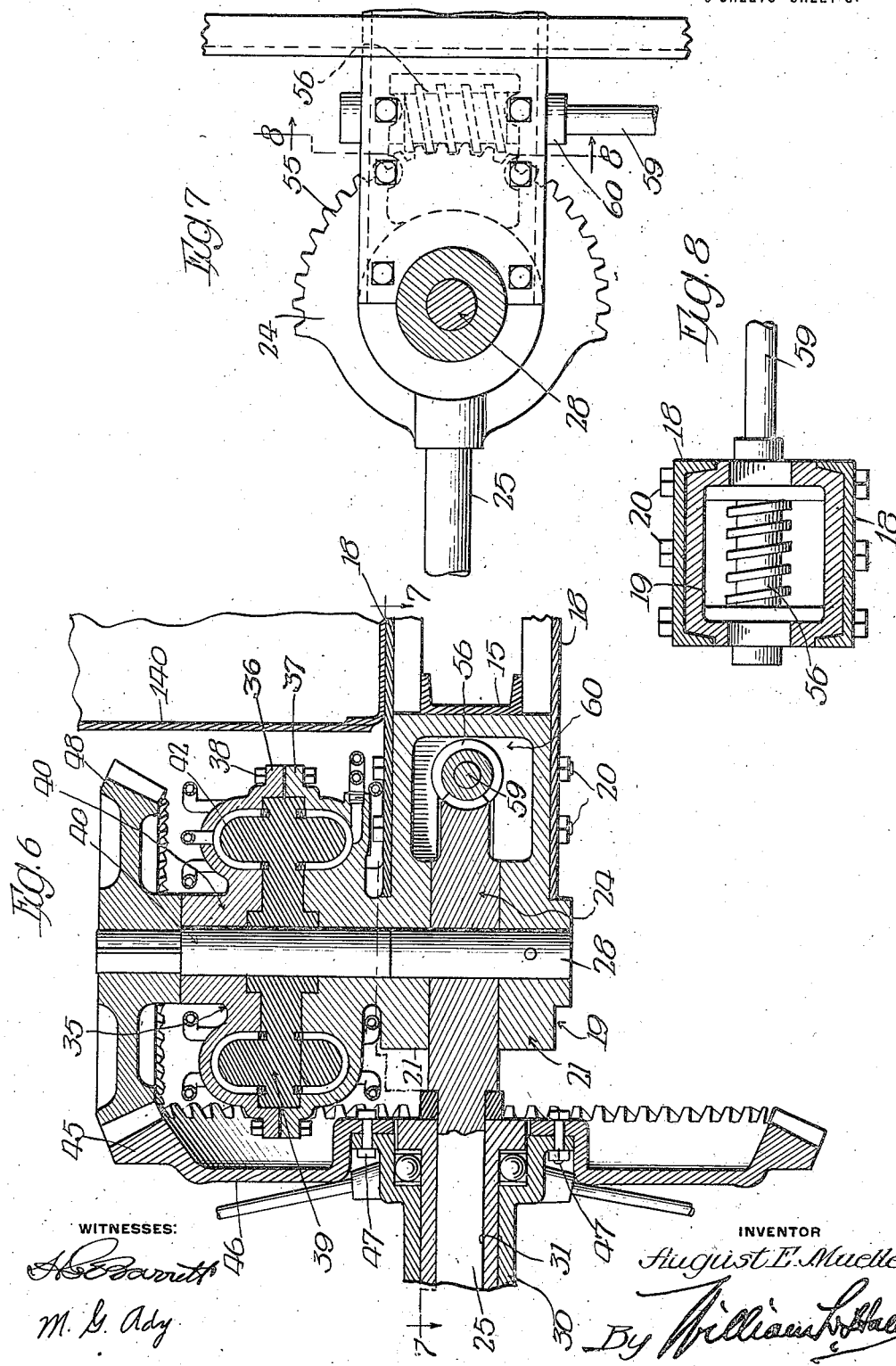

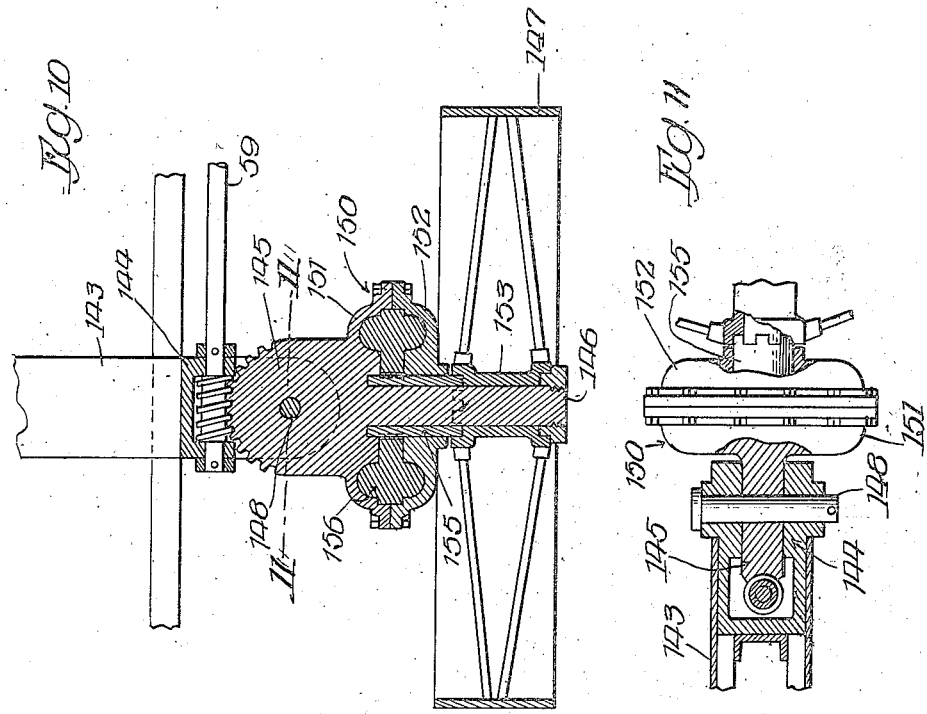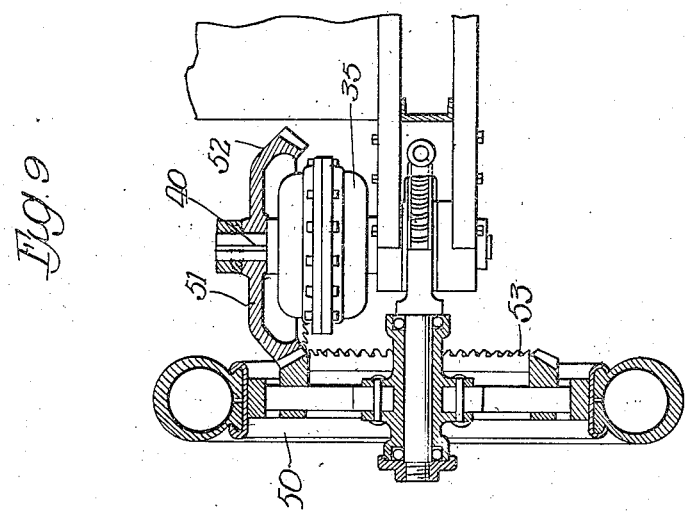

UNITED STATES PATENT OFFICE.

AUGUST E. MUELLER, OF CHICAGO, ILLINOIS, ASSIGNOR OF ONE-THIRD TO THOMAS J. HRUBY AND ONE-THIRD TO JOHN O. HRUBY, JR., BOTH OF CHICAGO, ILLINOIS.

MOTOR-VEHICLE.

1,276,250.   Specification of Letters Patent.   Patented Aug. 20, 1918.

Application filed July 22, 1916. Serial No. 110,642.

*To all whom it may concern:*

Be it known that I, AUGUST E. MUELLER, a citizen of Argentina, South America, and a resident of Chicago, in the county of Cook and State of Illinois, have invented certain new and useful Improvements in Motor-Vehicles; and I do hereby declare that the following is a full, clear, and exact description thereof, reference being had to the accompanying drawings, and to the characters of reference marked thereon, which form a part of this specification.

This invention relates to improvements in motor driven vehicles and refers more specifically to a construction of motor-driven vehicles commonly known as agricultural tractors. The vehicle is so designed, however, that it may be converted into a road vehicle for other than heavy hauling purposes, and certain of the features of construction may be embodied in pleasure vehicles.

Among the objects of the invention is to provide an improved motor driven vehicle which is capable of being equipped with a powerful power plant so arranged that the power is transmitted to the driving wheels with minimum loss due to transmission.

Another object of the invention is to provide novel means of mounting the motors or engines on the vehicle frame and for connecting them to the driving wheels.

Another object of the invention is to provide a novel means for so mounting the motors on the vehicle frame in connection with front and rear steering wheels, whereby the vehicle may be steered or directed through the use of both the front and rear wheels, while at the same time permitting the wheels to be driven directly by motors located suitably adjacent thereto.

A further object of the invention is to provide means whereby low wheels, suitable for road uses, may be substituted for the higher broader faced tractor wheels suitable for agricultural uses.

A further object of the invention is to provide an improved steam operated motor vehicle.

Other objects of the invention are to improve and simplify motor driven vehicles, and the invention consists in the combination and arrangement of the parts shown in the drawings and described in the specification, and is pointed out in the appended claims.

As shown in said drawings:—

Fig. 3 is a bottom view of the chassis.

Figure 2:
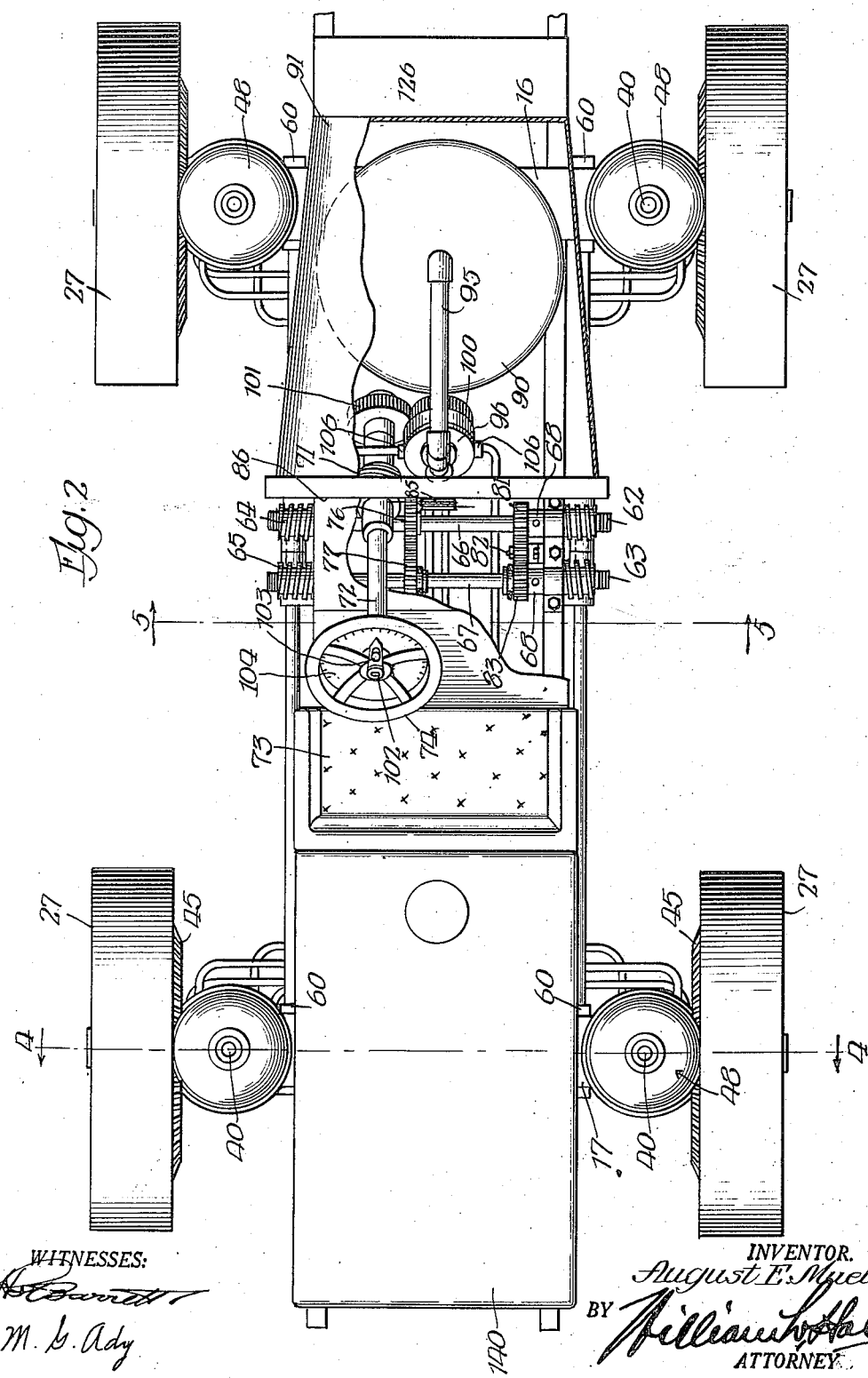
Fig. 2 is a plan view thereof, with parts broken away.

Figs. 4 and 5 are cross sections on the lines 4—4 and 5—5 respectively, of Fig. 2.

Fig. 6 is an axial section of one of the wheel bearing shafts and its motor and the parts operatively associated therewith.

Fig. 7 is a plan view as seen from the line 7—7 of Fig. 6.

Fig. 8 is a section on the line 8—8 of Fig. 7.

Fig. 9 is a sectional detail, illustrating the manner of adapting a smaller wheel to the vehicle.

Fig. 10 is a horizontal sectional detail, illustrating another mode of adapting the driving motor to the vehicle wheel.

Fig. 11 is a partial section and partial elevation as seen from the position indicated by the line 11—11 of Fig. 10.

Figure 1:
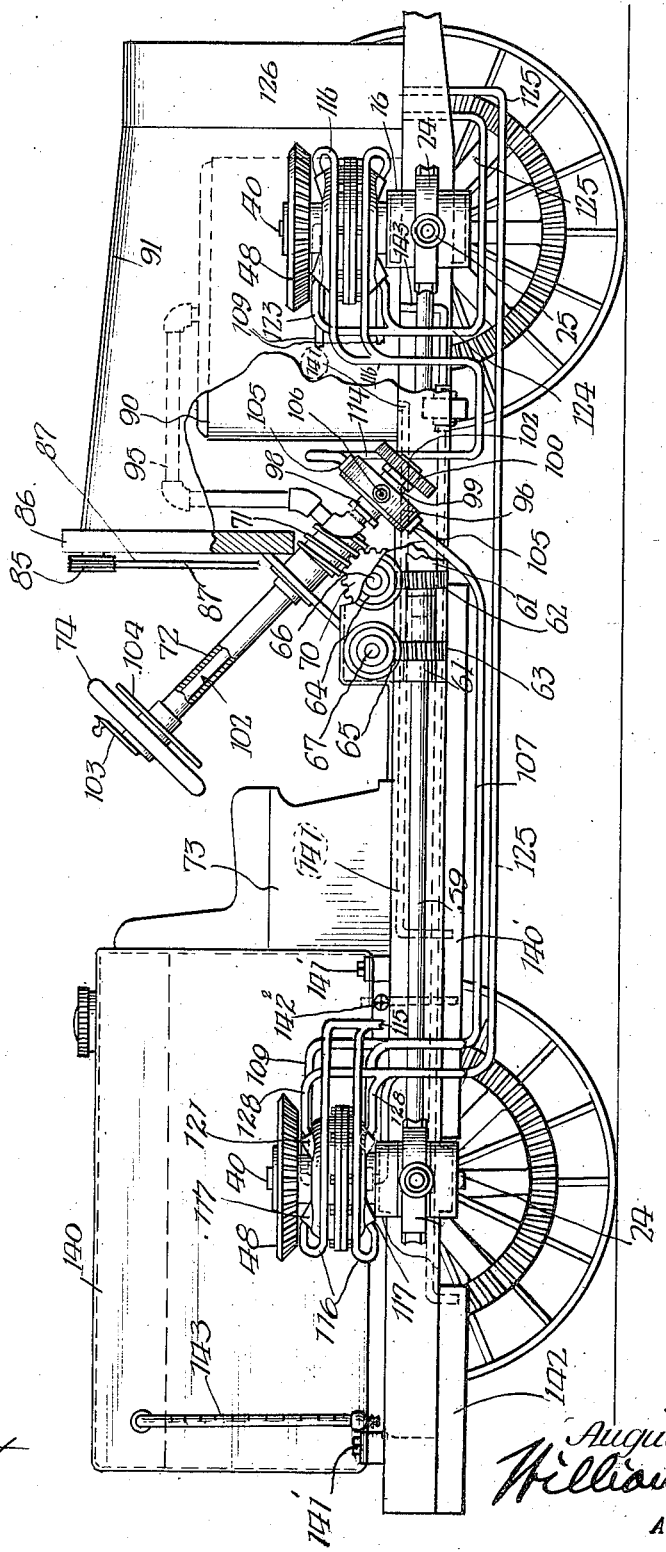
Figure 1 is a side elevation, with parts in section, of a motor vehicle embodying my invention.

The chassis of the vehicle comprises longitudinal side members 15, 15 and front and rear axle frames 16, 17. Said side members are preferably channel bars, and the axle frames, as best shown in Figs. 1, 4 and 5, comprise upper and lower channel bars 18, 18 and heavy end castings 19 which are fitted between the ends of the channel bars and are attached thereto by bolts 20. The ends of said side members extend between the upper and lower channel bars of the axle frames and are bolted or otherwise rigidly secured thereto. Thereby is produced a very rigid chassis structure. The said end castings are bifurcated, comprising upper and lower members 21, 21 to afford there-between spaces to receive the inner disk-shaped ends 24 of front and rear stub shafts 25, on which are rotatively mounted the front and rear wheels 27. The said stub shafts are pivotally mounted between the arms 21 of the end castings 19 by means of vertical pivot pins 28 which extend through central openings in the disks and alined openings in said arms. As herein shown, the hubs 30 of the wheels 27 are rotatively mounted on bushings 31 fixed over the stub shafts, suitable ball bearings being interposed between the hubs and bushings. The wheels 27 shown in Figs. 1, 2, 3, 4 and 6 are agricultural wheels, having broad flat rims or treads connected to the hub by wire spokes as herein shown.

In the construction shown in Figs. 1 to 6 inclusive and also in Fig. 9, the wheels of the vehicle are driven by four independently operable motors 35, herein shown as consisting of steam engines and made like the construction disclosed in my pending application for United States Letters Patent Serial No. 103,271, filed June 12, 1916. Each of said engines consists, generally, of two similar casing members 36, 37 (Fig. 6) which are fixed together by bolts 38, and an inner rotor 39 which is fixed to a central driving shaft 40 that is rotatively mounted in suitable bearings in the casing members. Said rotors, as in the construction shown in my said pending application, are provided at their sides with oppositely extending vanes or blades 42 against which steam is delivered through suitably located inlet ports at both sides of the engine, as shown in the aforesaid application and hereinafter referred to, the casing members being provided with exhaust ports for the exhaust of steam. In the construction shown in the aforesaid figures, the driving shafts of the motors are arranged vertically and are disposed in vertical alinement with respect to the adjacent pivots 28 of the stub shafts. As more clearly shown in Fig. 6, the lower casing member on each motor may be made an integral part of the upper arm of the axle frame casting 19 so as to afford a very rigid connection between the motors and the axle frames. However, if desired, the lower casing member of each engine may be bolted or otherwise rigidly secured to its axle frame casting.

The driving connections between the wheels and motors shown in Figs. 1 to 6 inclusive comprise large gears 45 concentric to the axis of rotation of the wheels, and formed on webs or plates 46 that are attached, as by means of bolts 47, to the hubs of the wheels, and beveled gears 48 which are keyed or otherwise non-rotatively secured to the upper ends of the engine shafts 40. With this construction, it will be noted that the stub shafts may be turned on their pivots 28 for steering the vehicle and that the arcs of movement of the parts of the gears 45 meshing with the gears 48 are concentric to the pivotal axes 28 of the stub shaft, so that said gears are maintained in driving mesh in all angular positions of the steering wheels relatively to the longitudinal axes of the axle frames.

In Fig. 9, I have shown means for gearing a smaller diameter wheel 50, of a type adaptable to road uses, to the engine shafts 40. In said construction the beveled gear wheels 48 are replaced by a crown-shaped gear wheel 51, the beveled teeth of which are formed on the annular depending portion 52 thereof so as to bring the said teeth nearer the axis of rotation of the wheel. The said wheel 50 is provided with a smaller annular gear 53 which meshes with the gear wheel 51, and is fixed in any suitable manner to the spokes of the wheel 50. In other respects, the construction shown in Fig. 9 is like that shown in the figures previously referred to.

The vehicle herein shown is designed to be steered by a steering gear made like that shown in my pending application for United States Letters Patent Serial No. 107,014, filed on the 1st day of July, 1916, and which may be briefly referred to herein as follows:

The disk-like inner end portions 24 of the stub shafts 25 are provided with a curved series of worm teeth 55 concentric to the axes of the pivot shafts 28 for the stub shafts. Said worm teeth mesh with worms 56 that are carried by the front and rear ends of longitudinally arranged, horizontal, front and rear pairs of alined shafts 58, 59, respectively, arranged outside of and parallel to the side members of the chassis. The shafts 58, 59 are mounted in suitable bearings 60, 60, formed on or carried by the front and rear axle frame castings 19 and other bearings 61, 61 supported on the side members of the chassis at the meeting ends of the shafts 58, 59. The front and rear shafts 58, 59 carry adjacent to their meeting ends worm wheels 62, 63, respectively, which mesh with worms 64, 65 that are carried by the outer ends of front and rear horizontal shafts 66, 67, respectively, which extend transversely across the chassis and are mounted in bearings 68 carried by the side members of the chassis. On the front transverse shaft 66 is mounted a worm wheel 70 that meshes with a worm 71 which is carried by the lower end of a steering post 72 located adjacent to the driver's seat 73 and provided with the usual steering wheel 74. Fixed to said front shaft 66 is a spur gear 76 that is adapted to mesh with a sliding spur gear 77 which is splined on the rear transverse shaft 67, said latter gear being adapted to be shifted on the shaft into and out of mesh with the gear 76 by means of a shifting lever 80. Fixed also to said front transverse shaft 66 is a second spur gear 81 which is in constant mesh with an idler gear 82 suitably supported on the chassis; and said idler gear is adapted to mesh with a sliding spur gear 83 which is splined on the rear transverse shaft 67 and is adapted to be shifted into and out of mesh with said idler gear 82 by means of a shifting lever 85.

If both the spur gears 77 and 83 be out of mesh with their mating gears 76 and 82, the rear pair of shafts 59 are disconnected from the steering post, so that the vehicle may be steered by the front wheels only. If the spur gear 77 be shifted into mesh with the spur gear 76, the rear pair of shafts 59 are connected to the steering post so as to be rotated in directions opposite to the directions of rotation of the front pair of shafts 58. With this adjustment, when the front wheels are swung in one direction by the steering post, the rear wheels are swung in the opposite direction. Thereby the vehicle may be made to turn about an axis located between the ends of the vehicle. If the spur gear 77 be disconnected from its mating gear 76 and the spur gear 83 be shifted into mesh with the idler gear 82, both the front and rear pairs of shafts 58, 59 are connected to the steering post to be turned in the same direction so as to simultaneously turn both front and rear wheels in the same direction for steering the vehicle bodily sidewise.

An indicator 815 is attached to the dashboard 86 and is provided with two independently operable indicating members, as hands sweeping over a dial, that are connected by cables 87, 88, to the front and rear longitudinal shafts 58, 59, respectively, of the steering gear in the manner set forth in my aforesaid prior application, whereby the positions of the front and rear wheels, with respect to a direct line of travel, may be observed and determined.

It will be apparent that when the steering gear is adjusted for front steering only, and the rear wheels are locked for direct or straight travel, the vehicle will be steered, so for as the function of the steering gear is concerned, in the same manner as an ordinary front steering vehicle. For some purposes, the vehicle may be constructed for front steering only and may be propelled by individual wheel motors applied to either the front or the rear wheels.

The motors 35 receive steam from a steam boiler 90 that is supported on the front end of the chassis and is inclosed by a suitable hood 91, at the rear end of which is located the dash board 86, before referred to. Said steam boiler may be made of any suitable or preferred type, such, for instance, as that illustrated in my pending application for United States Letters Patent Serial No. 102,627, filed on the 9th day of June, 1916.

Steam is conducted from said boiler through a pipe 95 to a distributing valve 96, from which steam is directed through suitably disposed pipes to the several engines. The valve 96 herein shown is of the type disclosed in my pending application for United States Letters Patent Serial No. 104,152, filed on the 17th day of June, 1916. The steam pipe 95 is connected to the inlet branch 98 disposed at one side of, and coaxial with, the valve. An operating stem 99 in line with said branch extends from the other side of the valve and is provided at its lower end with a gear wheel 100 which meshes with a gear wheel 101 that is fixed to the lower end of a shaft 102 that extends through and is rotatively mounted in the hollow steering post 72. The upper end of said shaft 102 is provided above the steering wheel 74 with an indicator arm 103 by which said shaft is rotated, and said indicator arm coöperates with a dial 104 below the steering wheel, said dial bearing a curved series of symbols or words to denote the stop, ahead and reverse adjustments of the valve.

As will be noted more particularly from an inspection of Figs. 1 and 3, said valve is provided with forwardly and rearwardly facing pairs of ports 105 and with laterally facing single ports 106. From corresponding ports of each pair of ports are led forwardly and rearwardly directed pipes 107 which are provided adjacent to the front and rear axle frames, respectively, with lateral branches 108 leading toward the engines, and said lateral branches are in turn provided with upper and lower terminals 109 which lead to inlet ports 111 on opposite sides of the several engines through which steam is admitted to drive the engines in ahead directions. From the other ports of said pair of ports are led pipes 114 which are likewise provided at their ends with laterally turned branches 115 directed toward the engines, and said branches are in turn formed with upper and lower terminals 116 that are connected to opposing ports 117 of the engines through which steam may be admitted to drive the engine ahead in conjunction with that admitted through the pipe 107 and port 111. Steam admitted through the port 111 is exhausted through ports 120, while steam admitted through the ports 117 is exhausted through ports 121. The exhaust ports 120 on opposite sides of the engines are connected by pipes 123, 123 with branch pipes 124 that are connected to exhaust pipes 125 which lead to a condenser 126 located at the front end of the hood 91. The oppositely located exhaust ports 121 are also connected to the branch pipes 124 of the exhaust pipes 125 by upper and lower terminals 128. Either one or two main exhaust pipes 125 may be employed. If two be employed, the engine at one side of the vehicle will be connected to a main exhaust pipe at one side of the vehicle, and the other engine will be connected to a main exhaust pipe at the other side of the vehicle. If the engines are to be driven at a moderate power only, steam is admitted thereto through the pipes 107 and the ports 111, and the impelling force of the steam is delivered against each rotor at one side only of the axis of rotation thereof. If additional power be required, steam is also delivered against the rotors through the pipe 114 and ports 117, so that the impelling force of the steam is directed against each rotor at both sides of its axis of rotation.

The lateral ports 106 of the distributing valve 96 are connected to pipes 130 which are turned at their ends at 131 laterally toward the engines, and said branches are provided at their ends with upper and lower terminals 132 which are connected to the oppositely located reverse inlet ports 133 of the engines through which steam is admitted to reverse the engines. The port 106 at one side of the valve serves the reverse inlet ports for the two engines at one side of the vehicle, while the port 106 at the other side of the valves serves the two engines at the other side of the vehicle.

It will, of course, be understood that the several inlet and exhaust pipes will be arranged with respect to each other and to the parts of the vehicle and the wheels as found most convenient and desirable, the arrangement of the pipes in the drawings being more or less diagrammatic.

The distributing valve 96 is operated through the medium of the indicator arm 103 and the shaft 102, and the adjustment of the valve is determined by the relation of the indicator arm to the words or symbols on the dial 104. As herein shown, the stop adjustment of the valve is at the center of the dial and the reverse and ahead positions are at each side thereof. On the ahead side of the disk is indicated the slow ahead and fast ahead adjustment of the valve, the slow ahead adjustment being that effected when steam is delivered through the pipes 107 and ports 111, and the full ahead adjustment being that when steam is delivered through both the pipes 107 and 114 and ports 111 and 117.

The weight of the boiler 90 and of the condenser 126, together with the engines for the front wheels, are such as to give effective tractive force to the front wheels. The rear end of the chassis, when the vehicle is used as a means of pulling loads such as agricultural implements, trailers and the like, may be suitably weighted to give efficient tractive force to the rear wheels. This may be accomplished by mounting on the rear end of the chassis a tank 140 of such size as to contain a body of water in excess of that required for supplying the boiler. The boiler may be supplied with water from a tank 140' through a pipe 141 associated with any suitable feed water device and the condenser may likewise be connected in any suitable manner with the feed water device. Said condenser may be an air-cooled condenser of any suitable type. 142 designates a fuel tank to contain a liquid fuel which may be supplied through a pipe 143 to the burner by any suitable or preferred fuel feed means. The tank 140 is preferably detachably fixed to the chassis, as by means of bolts 141', so that the same may be removed when it is desired to carry a vehicle body, which latter will have means to detachably support it on the chassis. The tank 140 may be connected to the tank 140' so that water may be supplied to the latter tank when necessary or desirable, the two tanks being connected by a valved pipe $140^2$ which may be detachably fixed to the tank 140 in any suitable manner. A graduated gage $140^3$ is provided to indicate and determine the quantity of water in the tank, so that the required weight may be carried to give a desired traction force to the rear wheels. Thereby it becomes practicable to vary the weight proportionately to the load to be carried or drawn.

In Figs. 10 and 11 is shown an arrangement of separate or independent motor wheel drive wherein a motor, constructed essentially like the motors shown in the previously described figures, is arranged with its axis of rotation horizontal and is supported on the swinging stub axle for the wheel which it drives. As therein shown, 143 designates an axle frame, to the outer end of which is fixed a heavy casting 144, which is longitudinally slotted to receive the inner disk-shaped end 145 of a stub axle 146, on which is mounted the wheel 147. The inner disk-like end of the shaft is pivoted to the axle frame casting by means of a pivot pin 148 extending through alined apertures in the disk and the upper and lower arms of the casting. 150 designates the motor, one casing member 151 of which is herein shown as made an integral part of the stub axle. The stub axle 146 extends through a central opening in the other casing member 152 and outwardly through the hub 153 of the wheel. 155 designates a tubular shaft which is keyed to the rotor 156 of the motor and is rotatively mounted in any suitable manner in that portion of the stub shaft which extends through the outer casing part 152. The outer end of said hollow motor shaft 155 is interlocked in any suitable manner to the inner end of the wheel hub 153, as, for instance, by providing said wheel hub and said shaft with interfitting lugs and notches as shown. The construction of the motor and the manner of delivering steam thereto will be substantially the same as that shown in the other figures and heretofore described and need not be repeated herein. Owing to the movability of the motor, due to its partaking of the swinging movement of the stub axle, it will be necessary to provide flexible connections between the steam pipes and the engine.

It will be understood that the structural details of the vehicle described may be considerably varied within the scope and spirit of the invention, and, further, that certain of the illustrated features of the construction may be employed in relations other than shown in the drawings. For instance, motors may be adapted to drive only the front or steering wheels in the manner herein shown to constitute the sole means for propelling the vehicle. It will furthermore be understood that, while I have herein shown steam engines as means for driving the wheels, any other suitable form of motor may be employed, as electric or gasolene motors. The appended claims are therefore not intended to be limited to the said structural details except as to such claims wherein said details are specifically enumerated.

I claim as my invention:—

1. In a motor vehicle, the combination with the chassis embracing a fixed axle frame; castings fitted to the ends of said frame, stub axles pivoted to said castings by vertical pivots, and wheels on said axles, of motors supported directly on said castings with their shafts vertically alined with the stub axle pivots; intermeshing gears on the motor shafts and wheels, and a steering gear operatively connected to said stub axles.

2. In a motor vehicle, the combination with the chassis embracing a fixed axle frame, stub axles pivoted to the ends of said axle frames by vertical pivots, and wheels on said axles, of motors supported on said axle frames with their shafts vertically alined with the stub axle pivots; intermeshing gears on the motor shafts and wheels, said stub axles being formed at their ends inwardly beyond their pivots with curved series of worm teeth concentric to their pivotal axes, and a steering gear embracing rotative shafts provided with worms which mesh with said worm teeth of the stub axles.

3. In a motor vehicle, the combination with the chassis embracing a fixed axle frame, stub axles pivoted to the ends of said axle frames by vertical pivots, and wheels on said axles, of motors supported on said axle frames with their shafts vertically alined with the stub axle pivots; intermeshing gears on the motor shafts and wheels, said stub axles being formed at their ends inwardly beyond their pivots with curved series of worm teeth concentric to their pivotal axes, and steering means embracing longitudinal rotative shafts mounted in bearings at the sides of the chassis and provided with worms which mesh with said worm teeth of the stub axles; a transverse shaft geared to said longitudinal shaft and a steering post geared to said transverse shaft.

4. A motor driven vehicle comprising a chassis; stub axles pivoted thereto; wheels mounted on said axles; rotary motors mounted on the chassis and rotating on axes alined with the pivotal axes of the stub axles; gears on the wheels; gears detachably fixed to the motor shafts and meshing with the wheel gears, whereby gears having gear teeth disposed at different distances from the axes of rotation of the wheels may be interchangeably applied to the motor shafts to mesh with gears of different diameters of wheels that are adapted to be interchangeably applied to the stub axles, and a steering gear operatively connected to said motor shafts.

5. A motor driven vehicle comprising a chassis; stub axles pivoted thereto; wheels mounted on said axles; annular gears fixed thereto; rotary motors mounted on the chassis and rotating on axes alined with the pivotal axes of the stub axles; gears mounted on the upper ends of the motor shafts with their toothed rims curved downwardly over the motors and meshing with the gear wheels at points radially inside their points of attachment to the motor shafts, and a steering gear operatively connected to said stub axles.

6. A motor vehicle comprising a chassis; supporting and steering wheels therefor; steam motors operatively connected to the steering wheels to drive them; a steam boiler supported on the chassis; a distributing and controlling valve communicating with the boiler; pipes connecting said valve to the inlet ports of said motors; a hollow steering post; operative connections between said post and the steering wheels, and a valve controlling shaft mounted in the hollow steering post and operatively connected to said valve.

7. A motor driven vehicle comprising a chassis; supporting and steering wheels therefor; steam motors operatively connected to the steering wheels to drive them; a steam boiler supported on the chassis; a distributing and controlling valve communicating with the boiler; pipes connecting said valve to the inlet ports of said motors; a hollow steering post provided with a hand wheel; operative connections between the post and steering wheels; a valve-controlling shaft mounted in the hollow steering post and operatively connected to said valve, and an indicator on said shaft at said hand wheel and coöperating with a dial carried by said post.

8. A motor driven vehicle comprising a chassis; supporting and steering wheels therefor; rotary steam motors operatively connected to the wheels to drive the same, said motors being provided on opposite sides of their rotors with ahead and reverse steam inlets and with exhaust ports; a steam boiler supported on the chassis; a distributing and controlling valve communicating with said boiler; pipes leading from said valve and branched toward said motors, said branches provided with forked terminals which extend on opposite sides of the motors for connection to the ahead steam inlet ports of the motors; other pipes leading from said valve and branched for connection to the opposite reverse inlet ports of the motors; operating means for said valve, and exhaust pipes leading from the exhaust ports of the motors.

9. A motor vehicle comprising a chassis; supporting and steering wheels therefor; steam motors, one for each wheel, operatively connected to the wheels to drive them; a steam boiler supported on the chassis; a distributing and controlling valve communicating with the boiler, and provided with two pairs of ports and with two oppositely located single ports; pipes connected to the ports of each pair and extending forwardly and rearwardly from the valve and provided at their ends with branches for connection with ahead inlet ports of the motors located on opposite sides of the axes of rotation thereof; other pipes connected to the single ports of the valve and extending forwardly and rearwardly therefrom and connected to reverse inlet ports of the motors, and operating means for said valve.

10. A motor vehicle comprising a chassis; supporting wheels therefor; steam motors, one for each wheel; a steam boiler supported on the chassis; a distributing and controlling valve communicating with the boiler; pipes connecting said valve to the inlet ports of said motors; operating means for said valve to simultaneously control the supply of steam to all the engines; a condenser supported on the chassis, and exhaust pipes connecting the exhaust ports of the motors with said condenser.

11. A motor vehicle comprising a chassis; supporting and steering wheels therefor; steam motors, one for each wheel, operatively connected to the wheels to drive them; a steam boiler supported on the chassis; a distributing and controlling valve communicating with the boiler, and provided with two pairs of ports and with two oppositely located single ports; pipes connected to the ports of each pair and extending forwardly and rearwardly from the valve and provided at their ends with branches for connection with ahead inlet ports of the motors; other pipes connected to the single ports of the valve and extending forwardly and rearwardly therefrom and connected to reverse inlet ports of the motors; operating means for said valve; a condenser carried by said chassis and exhaust pipes connecting all the exhaust ports of the several motors to said condenser.

12. A motor vehicle comprising a chassis; supporting and steering wheels therefor; steam motors, one for each wheel; operative connection between the motors and wheels to drive them; a steam boiler supported on the front end of the chassis; a distributing valve communicating with the boiler; pipes connecting said valve to the ahead inlet ports of the motors; other pipes connecting said valve to reverse inlet ports of the motors; operating means for said valve; a water tank supported on the rear end of the chassis, and a pipe connecting the water tank to the boiler.

13. A motor vehicle comprising a chassis; supporting and steering wheels therefor; steam motors, one for each wheel; operative connection between the motors and wheels to drive them; a steam boiler supported on the front end of the chassis; a hood inclosing said boiler; a distributing valve communicating with the boiler; pipes connecting said valve to the ahead inlet ports of the motors; other pipes connecting said valve to reverse inlet ports of the motors; operating means for said valve; a condenser supported on the chassis in front of the engine; pipes leading from the exhaust ports of the engine to the condenser; a water tank supported on the rear end of the chassis, and a pipe connecting the water tank to the boiler.

In testimony whereof, I have hereunto set my hand, at Chicago, Illinois, this 12th day of July, 1916.

AUGUST E. MUELLER.

Witnesses:
W. L. HALL,
GRACE A. SOUTHWELL.